United States Patent
Nakano et al.

(10) Patent No.: US 6,532,475 B1
(45) Date of Patent: Mar. 11, 2003

(54) MAP INFORMATION PROVIDING SYSTEM AND MAP INFORMATION SEARCHING METHOD

(75) Inventors: Toshiaki Nakano, Tokyo-to (JP); Giichi Hayashi, Tokyo-to (JP)

(73) Assignees: Increment P Corporation, Tokyo-To (JP); Pioneer Electronic Corporation, Tokyo-To (JP)

( * ) Notice: Subject to any disclaimer, the term of this patent is extended or adjusted under 35 U.S.C. 154(b) by 0 days.

(21) Appl. No.: 09/315,766

(22) Filed: May 20, 1999

(30) Foreign Application Priority Data

May 28, 1998 (JP) ............................................ 10-147889

(51) Int. Cl.⁷ ................................................ G06F 17/30
(52) U.S. Cl. ..................... 707/104.1; 707/101; 707/102; 707/103 R; 707/3
(58) Field of Search .......................... 707/2, 3, 10, 102, 707/103 R, 104.1, 101, 501; 701/201, 209, 211, 200, 208

(56) References Cited

U.S. PATENT DOCUMENTS

| | | | | |
|---|---|---|---|---|
| 5,581,758 A | * | 12/1996 | Burnett et al. | ........... 707/103 R |
| 5,729,730 A | * | 3/1998 | Wlaschin et al. | ............... 707/3 |
| 5,832,496 A | * | 11/1998 | Anand et al. | ................ 707/102 |
| 5,870,746 A | * | 2/1999 | Knutson et al. | ............ 707/101 |
| 5,944,769 A | * | 8/1999 | Musk et al. | ................. 701/201 |
| 6,134,558 A | * | 10/2000 | Hong et al. | .............. 707/103 R |
| 6,199,014 B1 | * | 3/2001 | Walker et al. | ............... 701/211 |
| 6,263,343 B1 | * | 7/2001 | Hirono | ........................ 707/104 |
| 6,266,673 B1 | * | 7/2001 | Hong et al. | .................. 707/103 |

FOREIGN PATENT DOCUMENTS

EP    0274392 A2  *  7/1988  ........... G06F/15/40

OTHER PUBLICATIONS

Baumann, Peter, "Web–enabled Raster GIS Services for Large Image and Map Databases", Proceedings of the 12th International Workshop on Database and Expert Systems Applications, Sep. 3–7, 2001, pp. 870–874.*

Chuanjiu, Wang et al., "Development of an Internet–Based Trip Guidance System", Proceedings of the IEEE International Vehicle Electronics Conference, Sep. 6–9, 1999, vol. 1, pp. 278–281.*

* cited by examiner

*Primary Examiner*—Kim Vu
*Assistant Examiner*—Shahid Alam
(74) *Attorney, Agent, or Firm*—Ladas & Parry

(57) ABSTRACT

A map information providing system for providing map data to a terminal device via a data transmission path, includes: a first server, the first server including a first storage unit for storing map data; and a second server connected with the first server and the terminal device via a network, the second server including a second storage unit for storing the map data. The first server includes: a unit for producing map search table which designates at least one of the first storage unit, the second storage unit and a third storage unit in the terminal device, from which certain map data is to be obtained; and a unit for transmitting the produced map searching table to the terminal device to be stored in the terminal device.

10 Claims, 6 Drawing Sheets

| REGION | WWW SERVER | LOCAL SERVER | TERMINAL DEVICE |
|---|---|---|---|
| INSIDE TOKYO | X | X | O |
| INSIDE JAPAN | X | O | X |
| OUTSIDE JAPAN | O | X | X |

FIG. 5A

MAP DATA OF SCALE 1/50000

| REGION | WWW SERVER | LOCAL SERVER | TERMINAL DEVICE |
|---|---|---|---|
| REGION 1-1 | X | X | O |
| REGION 1-2 | X | X | O |
| ⋮ | ⋮ | ⋮ | ⋮ |
| ⋮ | ⋮ | ⋮ | ⋮ |
| REGION n-m | X | X | O |

FIG. 5B

MAP DATA OF SCALE 1/25000

| REGION | WWW SERVER | LOCAL SERVER | TERMINAL DEVICE |
|---|---|---|---|
| REGION 1-1 | X | O | X |
| REGION 1-2 | X | O | X |
| ⋮ | ⋮ | ⋮ | ⋮ |
| ⋮ | ⋮ | ⋮ | ⋮ |
| REGION n-m | X | O | X |

FIG. 5C

MAP DATA OF SCALE 1/10000

| REGION | WWW SERVER | LOCAL SERVER | TERMINAL DEVICE |
|---|---|---|---|
| REGION 1-1 | O | X | X |
| REGION 1-2 | O | X | X |
| ⋮ | ⋮ | ⋮ | ⋮ |
| ⋮ | ⋮ | ⋮ | ⋮ |
| REGION n-m | O | X | X |

FIG. 6A

MAP DATA OF SCALE 1/25000

| REGION | WWW SERVER | LOCAL SERVER | TERMINAL DEVICE |
|---|---|---|---|
| REGION 1-1 | O | X | X |
| REGION 1-2 | O | X | X |
| ⋮ | ⋮ | ⋮ | ⋮ |
| REGION n-m | X | X | X |

FIG. 6B

MAP DATA OF SCALE 1/50000

| REGION | WWW SERVER | LOCAL SERVER | TERMINAL DEVICE |
|---|---|---|---|
| REGION 1-1 | O | O | X |
| REGION 1-2 | O | O | X |
| ⋮ | ⋮ | ⋮ | ⋮ |
| REGION n-m | O | X | X |

FIG. 7

| REGION | WWW SERVER | LOCAL SERVER | TERMINAL DEVICE |
|---|---|---|---|
| REGION 1-1 | 1997.6.1 | 1997.6.1 | 1997.1.1 |
| REGION 1-2 | 1997.6.1 | 1997.6.1 | 1997.1.1 |
| ⋮ | ⋮ | ⋮ | ⋮ |
| REGION 3-1 | 1997.10.15 | 1997.6.1 | 1997.5.1 |
| ⋮ | ⋮ | ⋮ | ⋮ |
| REGION n-m | 1997.4.20 | 1997.4.20 | 1997.3.1 | ns
MAP INFORMATION PROVIDING SYSTEM AND MAP INFORMATION SEARCHING METHOD

BACKGROUND OF THE INVENTION

1. Field of the Invention

The present invention relates to a system which provides map information via an information transmitting means such as a network (the internet, a Local Area Network (LAN) and the like).

2. Description of the Prior Art

Recently, people can obtain desired map information using terminal devices. In one method, a user accesses a storage medium such as a CD-ROM on which map information is stored, and reads out the stored map information therefrom to display it on a screen of the terminal device.

In another method, a network serving as an information transmission means, such as the internet, is used to obtain map information. There are various kinds of information services provided via the internet, including a map information searching and displaying service. In the service of this kind, the user can access a WWW server, which has a map database and is connected to the internet, to obtain desired map information and display it on the terminal device. Specifically, when the user designates an address, a place name, a station name, a name of various kinds of facilities, a shop name, and the like on the terminal device, map information of the designated place and the area around there is displayed on the terminal device as picture information. Therefore, the user can see the displayed map information to easily know the position of the station, facility and the like of interest.

However, in the above-mentioned method using the storage medium such as a CD-ROM, if map information is revised, the user should get the storage medium of the new version. In addition, such a storage medium inherently has a limit in its storage capacity, and it is sometimes difficult or impossible for the user to obtain desired map information if he or she needs map information of very broad area, such as world map, or very detailed map information.

On the other hand, in the method using the internet, such problem does not occur because the map database of the WWW server generally stores various kinds of map data. However, since the user needs to access the WWW server via the internet and download desired map information (i.e., picture data) to the terminal device, it takes certain period of time. Particularly, if the user wants map information of the area which he or she frequently uses, e.g., map information around his or her home, office or client, etc., it is troublesome to connect with the internet and download map data every time the user needs it.

SUMMARY OF THE INVENTION

In view of the above mentioned problems, it is an object of the present invention to provide a map information providing system and a map information searching method capable of quickly and efficiently obtaining desired map information at a terminal device connected to a network such as the internet.

According to one aspect of the present invention, there is provided a map information providing system for providing map data to a terminal device via a data transmission path, including: a first server, the first server including a first storage unit for storing map data; and a second server connected with the first server and the terminal device via a network, the second server including a second storage unit for storing the map data, the first server including: a unit for producing map search table which designates at least one of the first storage unit, the second storage unit and a third storage unit in the terminal device, from which certain map data is to be obtained; and a unit for transmitting the produced map searching table to the terminal device to be stored in the terminal device.

In accordance with the map information providing system thus configured, the first server produces map search table which designates at least one of the first storage unit, the second storage unit and a third storage unit in the terminal device, from which certain map data is to be obtained. Then, the first server transmits the map search table to the terminal device and make the terminal device store the map search table. Therefore, the terminal device can refer to the map searching table to determine the storage unit and access it to obtain the desired map data.

In a preferred embodiment, the map searching table may include instructions to obtain the map data of a first region from the third storage unit, to obtain the map data of a second region broader than the first region from the second storage unit and to obtain the map data of a third region broader than the second region from the first storage unit. Thus, the user can obtain the map data of relatively limited region from the third storage unit in the terminal device quickly, and obtain the map data of relatively broad region from the first or second storage unit via the network, thereby enabling quick and efficient map providing operation.

In another preferred embodiment, the map searching table may include instructions to obtain the map data of a first scale from the third storage unit, to obtain the map data of a second scale larger than the first scale from the second storage unit and to obtain the map data of a third scale larger than the second scale from the first storage unit. By this, relatively rough map information can be quickly obtained from the terminal device. Also, the detailed map information, generally having a large data capacity, is obtained from the first or second storage unit via the network. Therefore, desired map information may be quickly and efficiently obtained without excessively or unnecessarily occupying the storage capacity of the terminal device.

In a still another preferred embodiment, the map searching table may include revision information indicating revision dates of the respective map data stored in the first storage unit, the second storage unit and the third storage unit. Thus, by referring to the map searching table, the user can constantly obtain the map information of the newest version.

According to another aspect of the present invention, there is provided a map information searching method executed in a map information searching method executed in a map information providing system including: a first server including a first storage unit for storing map data; a second server connected with the first server via a network and having a second storage unit for storing the map data; and at least one terminal device connected with the second server via the network and including a third storage unit for storing the map data and a map searching table which designates at least one of the first storage unit, the second storage unit and a third storage unit in the terminal device, from which certain map data is to be obtained, the method including the steps of: at the terminal device, receiving from a user an input designating map data to be searched for; referring to the map searching table and determining one of the first storage unit, the second storage unit and the third storage unit, from which the map data designated by the user is to be obtained; accessing the storage unit determined by the determining step to obtain the designated map data; and displaying the obtained map data on a display device of the terminal device.

In accordance with the map information searching method, the map search table includes designations of at least one of the first storage unit, the second storage unit and a third storage unit in the terminal device, from which certain map data is to be obtained. Therefore, the terminal device can refer to the map searching table to determine the storage unit and access it to obtain the desired map data.

In a preferred embodiment, the method may further include the steps of: storing the map data of a first region in the third storage unit, storing the map data of a second region larger than the first region in the second storage unit and storing the map data of a third region larger than the second region in the first storage unit; and storing, in the map searching table, information indicating one of the storage units in which the map data is stored. Thus, the user can obtain the map data of relatively limited region from the third storage unit in the terminal device quickly, and obtain the map data of relatively broad region from the first or second storage unit via the network, thereby enabling quick and efficient map providing operation.

In another preferred embodiment, the method may further include the steps of: storing the map data of a first scale in the third storage unit, storing the map data of a second scale larger than the first scale in the second storage unit and storing the map data of a third scale larger than the second scale in the first storage unit; and storing, in the map searching table, information indicating one of the storage units in which the map data is stored. By this, relatively rough map information can be quickly obtained from the terminal device. Also, the detailed map information, generally a having large capacity, is obtained from the first or second storage unit via the network. Therefore, desired map information may be quickly and efficiently obtained without excessively or unnecessarily occupying the storage capacity of the terminal device.

In still another preferred embodiment, the method may further include the step of storing, in the map searching table, revision information indicating revision dates of the respective map data stored in the first storage unit, the second storage unit and the third storage unit. Thus, by referring to the map searching table, the user can constantly obtain the map information of the newest version.

According to still another aspect of the present invention, there is provided a map information searching method executed in a map information providing system including: a first server including a first storage unit for storing map data; a second server connected with the first server via a network and having a second storage unit for storing the map data; and at least one terminal device connected with the second server via the network and including a third storage unit for storing the map data, the method including the steps of: a first step for receiving from a user, at the terminal device, an input designating map data to be searched for; a second step for determining whether or not the designated map data is stored in the third storage unit; a third step for accessing the third storage unit to obtain the designated map data if it is determined in the second step that the designated map data is stored in the third storage unit; a fourth step for determining whether or not the designated map data is stored in the second storage unit if it is determined in the second step that designated map data is not stored in the third storage unit; a fifth step for accessing the second storage unit to obtain the designated map data if it is determined in the fourth step that the designated map data is stored in the second storage unit; a sixth step for determining whether or not the designated map data is stored in the first storage unit if it is determined in the fifth step that the designated map data is not stored in the second storage unit; a seventh step for accessing the first storage unit to obtain the designated map data if it is determined in the sixth step that the designated map data is stored in the first storage unit; and an eighth step for displaying, on a display device of the terminal device, the map data obtained in one of the third step, the fifth step and the seventh step.

In accordance with the map information searching method, storage position of the designated map data is automatically determined to be one of the first to third storage units, and the map data can be obtained by accessing the storage unit thus determined.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 5A to 5C show examples of map searching tables according to the second embodiment of the present invention;

FIGS. 6A and 6B show other examples of map searching tables according to the second embodiment of the present invention;

FIG. 7 shows an example of a map searching table according to the third embodiment of the present invention.

DETAILED DESCRIPTION OF THE PREFERRED EMBODIMENTS

The preferred embodiments of the present invention will now be described below with reference to the attached drawings.

[A] System Configuration

Figure 1:
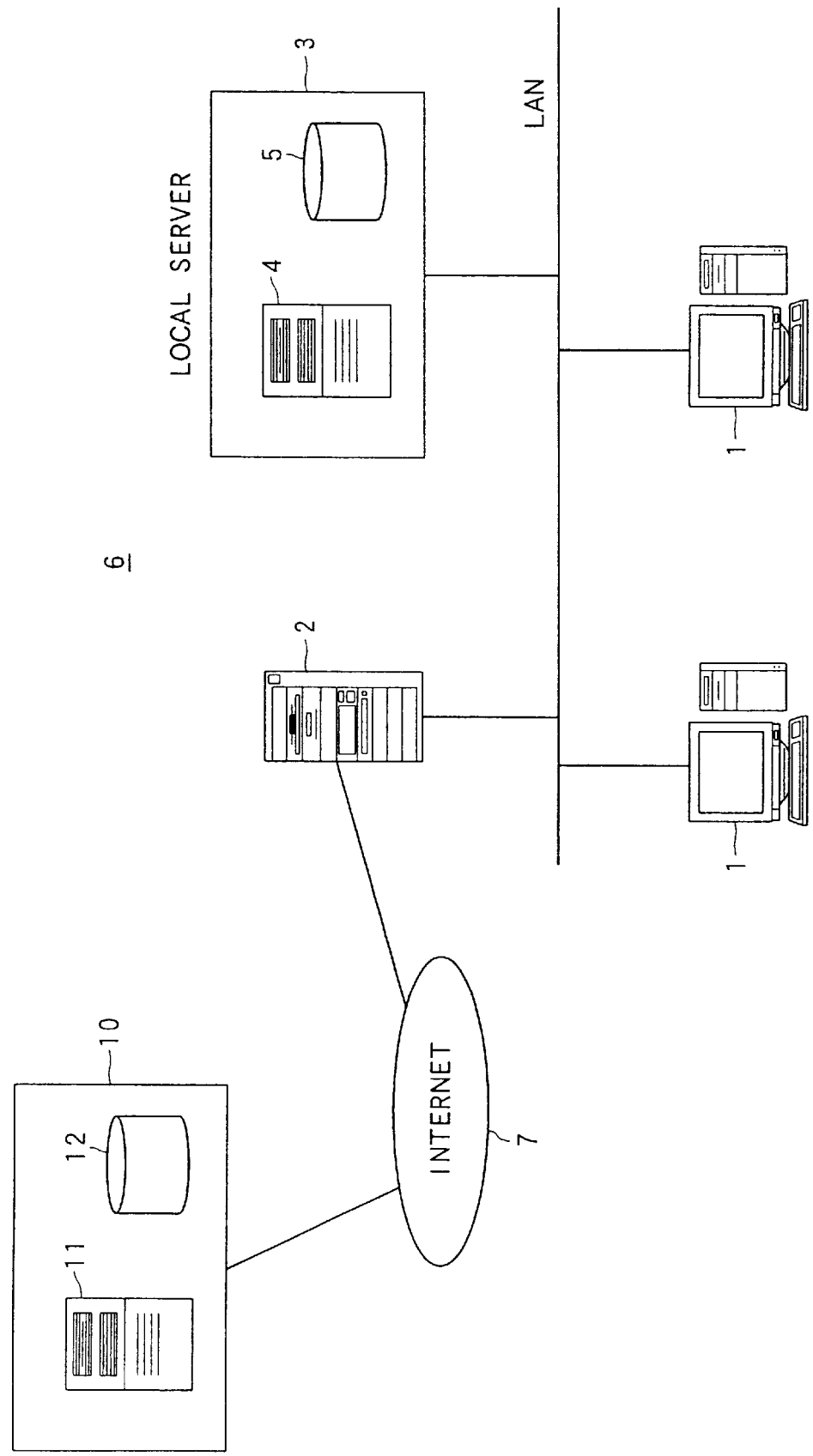
FIG. 1 is a diagram showing a schematic configuration of a map information providing system according to the embodiments of the present invention.

FIG. 1 shows a schematic configuration of a map information providing system according to the present invention. As shown, the map information providing system includes a WWW server 10 and a LAN 6, both of which are connected to the internet 7.

The WWW server 10 is a center for carrying out the map information providing service on the internet 7, and includes a server 11 and a map database 12. The map database 12 stores position information (e.g., coordinate information) on the map, such as latitude data and longitude data as well as picture data of the map corresponding to those position information (hereinafter referred to as "map data"). The map data has a multiple hierarchical structure in which multiple hierarchies correspond to map data of different scales. Namely, plural groups of map data of different scales, such as the whole Japan map, the prefecture level map, etc. are prepared. Specifically, the whole Japan or a certain area of Japan is divided into plural regions in a mesh manner, and the map data of each of the divided regions (hereinafter referred to as "map file") is assigned with a map file name (i.e., classification number), thus classifying the map data. Therefore, the map files are prepared for various scales, and each map file is specified by the map file name (e.g., region 1—1, region 1–2, . . . , region n–m) indicating the region thus classified. It is noted that the details of the map data to be stored in the map database 12 will be described later with reference to the embodiments.

The LAN 6 is connected to the internet 7 via a relay server 2, and terminal devices 1 and a local server 3 are also connected to the LAN 6. The local server 3 includes a server 4 and a local database 5. The local data base 5 also stores map data, the detail of which will be described later.

Next, the description will be given of the method of obtaining map data at the terminal device 1. In the map information providing system according to the present invention, the map data is divided into three groups and stored in three storage locations, i.e., the map database 12 in the WWW server 10, the local database 5 in the local server 3 and the hard disk (not shown) in each terminal device 1. Accordingly, the user operates the terminal device 1 to obtain desired map data from one of the three storage locations. Specifically, when obtaining map information of the desired area, the user runs the map searching program in the terminal device 1. During the execution of this program, the user inputs or designates information relating to the desired area, and the scale of the map data corresponding to the designated area. The map searching program has a function to selectively access appropriate one of the hard disk in the terminal device 1, the local database 5 and the map database 12, according to the user's inputs, to obtain the designated map data.

Figure 2:
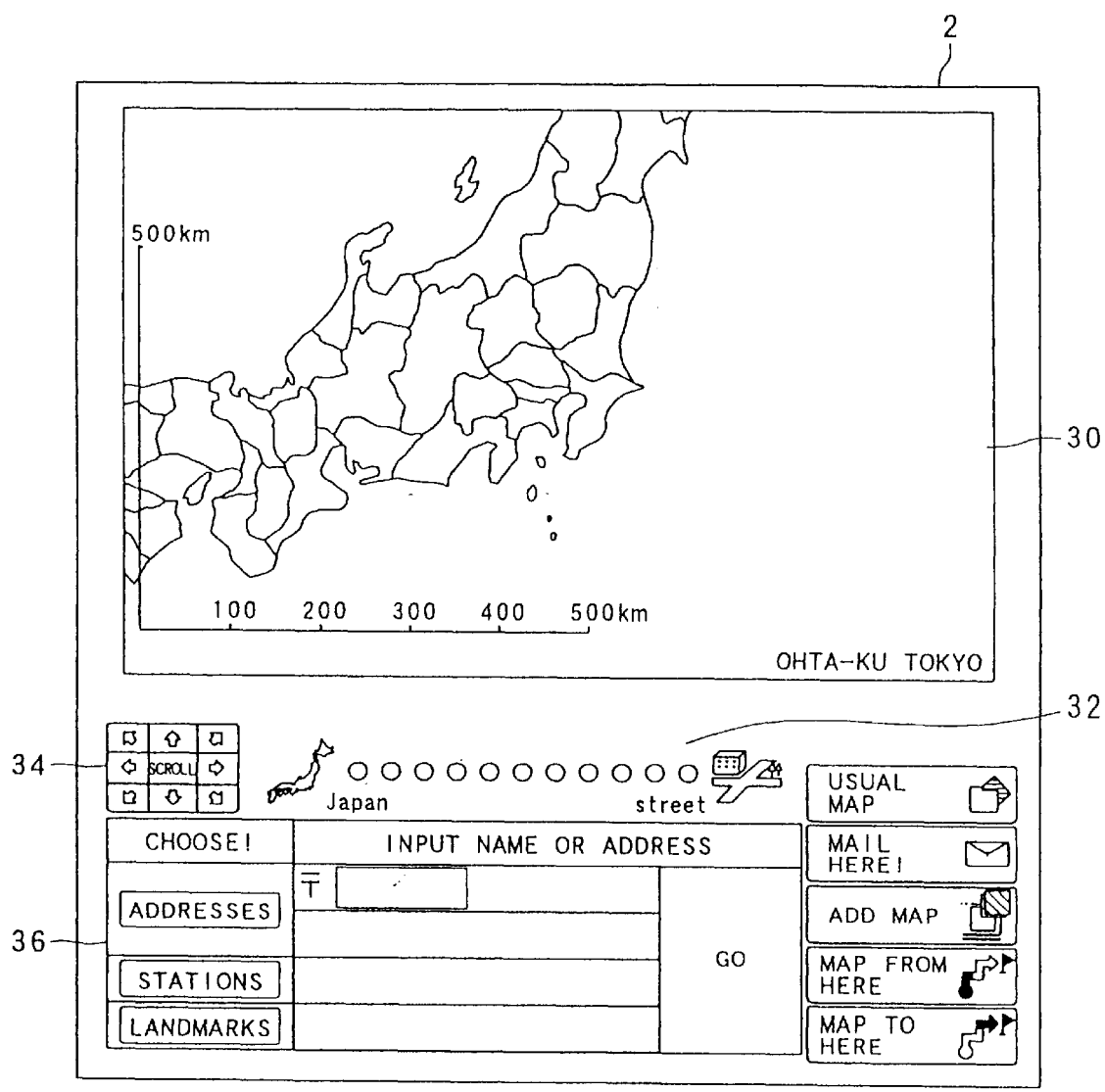
FIG. 2 shows an example of an initial display of a map searching program.
Figures 3, 4:
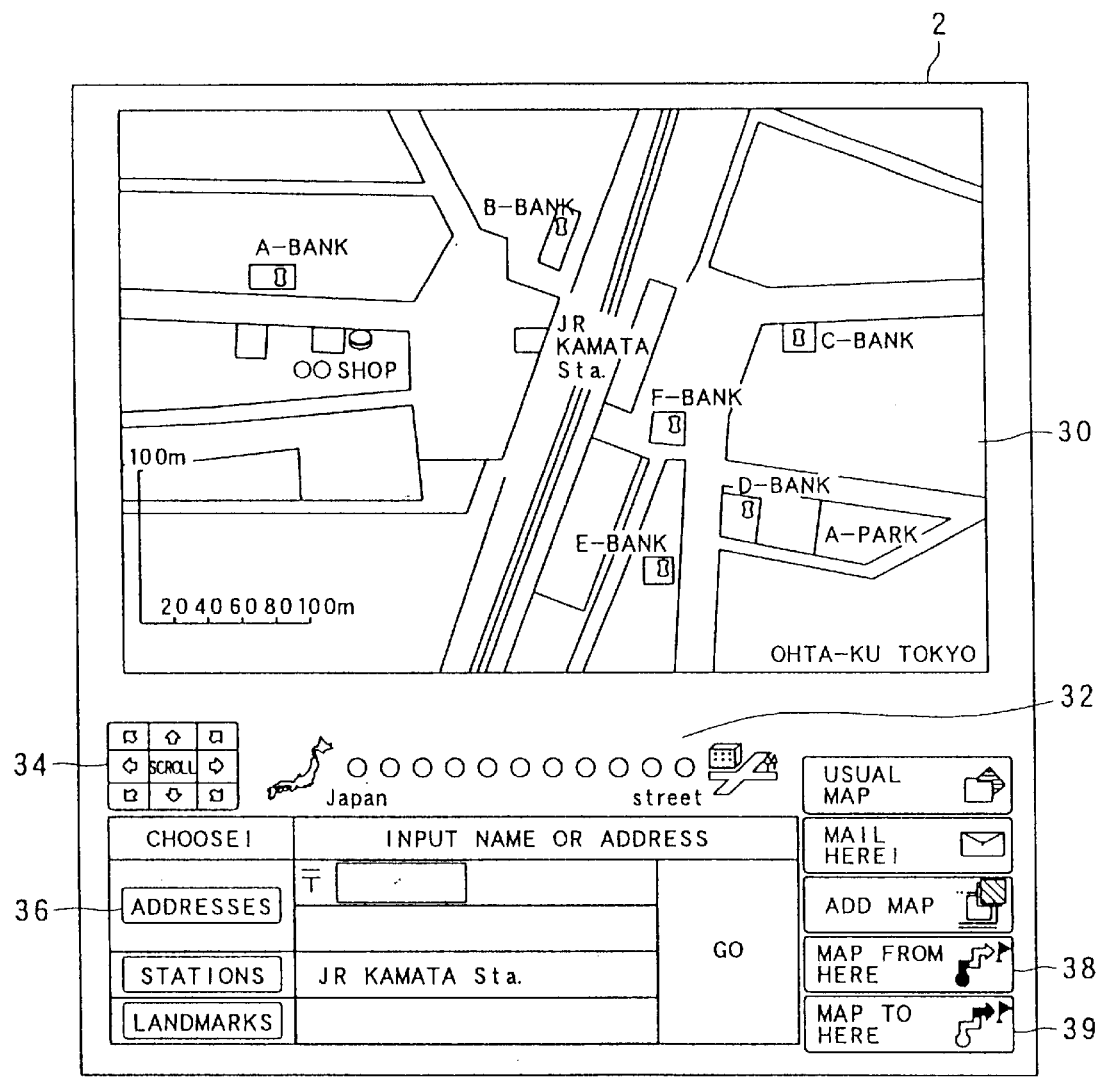
FIG. 3 shows an example of a display of the map searching program at a map search input stage.
FIG. 4 shows an example of a map searching table according to the first embodiment of the present invention.

The examples of the input screen of the map searching program are shown in FIGS. 2 and 3. FIG. 2 shows an example of the initial display of the map information searching program. In FIG. 2, there is a map display portion 30 at the upper area of the screen 2, wherein map picture is displayed. Just below the map display portion 30, there is a scale designation portion 32, which indicates the scale of the map displayed within the map display portion 30. The buttons in the scale designation portion 32 correspond to different scales (11 levels in this example). In the example shown in FIG. 3, the map picture is displayed with its smallest scale (nearest to the Japan mark at its left side). In order to magnify the displayed map picture, the user should click the button at right side (closer to the "street") to display the map picture of larger scale. On the left of the scale designation portion 32, a scrolling portion 34 is displayed. The scrolling portion 34 is used to display the map picture of the area around the currently displayed area and includes the arrows in eight directions from the currently displayed position. If the user clicks the upward arrow in the scrolling portion 34, for example, the map picture of the neighboring area in north direction of the currently displayed area appears on the map display portion 30.

Below the scale designation portion 32, there is provided an input portion 36 used to designate and/or input the desired place to be searched for. On the left side of the input portion 36, buttons of "ADDRESSES", "STATIONS" and "LANDMARKS" are shown. By clicking those buttons, a list of candidate addresses, station names or landmark names appears. Then, the user can choose the desired candidate to display the map picture of that place. On the right side of the input portion 36, input boxes of address, station name and landmark name are displayed, and the user can input address and/or name of the desired place via an input device such as a keyboard and/or mouse in the user terminal device 1. For example, if the user inputs the station name "JR KAMATA Sta." in the station name box, the map picture around the JR KAMATA station appears on the map display portion 30 as shown in FIG. 3. Thus, the user inputs, with watching the screen of the terminal device 1, information relating to the area to be searched for and the scale of the map to be displayed.

When the user inputs necessary information, the map searching program refers to the map searching table stored in the terminal device 1. The map searching table indicates one of the three storage locations, i.e., the map database 12, the local database 5 and the hard disk in the terminal device 1, in which the map data designated by the user is stored. By referring to the this map searching table, the map searching program accesses the designated storage location to obtain designated map data. Namely, if the map searching table designates the map database 12 in the WWW server 10, the map searching program connects with the internet 7 and accesses the map database 12 in the WWW server 10 to download the designated map data to the terminal device 1. If the map searching table designates the local database 5, the map searching program connects with the local server 3 via the LAN 6 and accesses the local database 5 to obtain and download the designated map data to the terminal device 1. If the map searching table designates the hard disk in the terminal device 1, the map searching program accesses the hard disk in the terminal device 1 to obtain the designated map data and display it. Thus, the user obtains desired map data at the terminal device 1 and displays it on the screen of the terminal device 1.

Next, the description will be given of the contents of the map searching table. A novel feature of the present invention is that the map data which the user can obtain are appropriately distributed to and stored in the three storage locations, i.e., the map database 12 in the WWW server 10, the local database 5 in the LAN 6 and the hard disk in the terminal device 10 so that the user can access the appropriate storage location, by referring to the map searching table, to obtain the desired map information. Now, the contents of the map searching table and the map searching process based on the contents will be described by referring to the first to third embodiments.

[B] 1st Embodiment

In the first embodiment, the map data which the user frequently uses and/or map data of relatively limited area is stored in the hard disk in the terminal device 1. The map data for the area which is used relatively infrequently is stored in the local database 5. Further the map information which the user infrequently uses and/or map information for relatively broad are a is stored in the map database 12 in the WWW server 10.

FIG. 4 shows an example of the map searching table according to the first embodiment. It is noted that FIG. 4 shows the example of the map searching table which is stored in a terminal device 1 which belongs to an in-house LAN 6 of a company located in Tokyo. As shown, in the map searching table, the map data inside of Tokyo, which is most frequently used from the terminal device 1m is stored in the hard disk of the terminal device 1, and the map data inside of Japan, which is secondly frequently used, is stored in the local database 5 of the local server 3. The map data outside of Japan, which is infrequently used, is stored in the map database 12 in the WWW server 10. In addition, the map searching table indicating the storage locations of those map data is stored in the terminal device 1. It is noted that, in practice, the map data are specified by the name of the respective map files (e.g., region 1—1, etc.) as described above. However, in FIG. 4, the respective map data are represented by the region names for the sake of convenience in the description. Actually, in the column "REGION" in FIG. 4, the map file names corresponding to the respective regions are stored like FIGS. 5 to 7.

At the time of searching the map information, when the user designates the map of certain region in Tokyo by operating the terminal device 1, the map searching program refers to the map searching table of FIG. 4, accesses the map data in the hard disk of the terminal device 1 to obtain the designated map data, and displays it on the screen of the terminal device 1.

Therefore, it is unnecessary to connect with the LAN 6 or the internet 7, and the user can quickly obtain the desired map information. On the other hand, if the user searches for the map data of outside of Tokyo or outside of Japan, the map searching program accesses the local server 5 in the LAN 6 or the map database 12 in the WWW server 10 to obtain the map data. As a result, the user can quickly get the map information which he or she frequently uses without connecting with the internet 7 or the LAN 6. At the same time, since the map data stored in the terminal device 1 is limited to those which are frequently used or which correspond to limited small areas, it may be possible to prevent the storage area of the hard disk in the terminal device from being unnecessarily occupied.

The map data to be stored in the hard disk of the terminal device 1 and/or the local database 5 may be appropriately changed in consideration of the user's access history. For example, the terminal device may store, with using the map searching program, the identification information of the map file designated by the user together with the number of times the user accessed that map file, and changes the storage location of the map data which is accessed more frequently than a given reference, e.g., more than predetermined times or a predetermined frequency (given times per month) from the further storage location to nearer storage location from the user terminal device 1, e.g., from the WWW server 10 to the local server 3, or from the local server 3 to the user terminal device 1. Reversely, map files infrequently accessed may be moved to further storage location from the user terminal device 1. With the aid of such change, if business with a new client starts and increases, for example, the map data around the new client's office can be moved from the further storage location to the user terminal device 1 to enable quick search.

[C] 2nd Embodiment

In the second embodiment, the map data of different scales for the same region are distributed to three storage locations, i.e., the map database 12, the local database 5 and the terminal device 1. Specifically, for the map of whole Japan, the hard disk of the terminal device 1 stores map data of smallest scale (i.e., roughest map), and the local database 5 stores map data of larger scale. The map database 12 in the WWW server 10 stores map data of largest scale (i.e., most detailed map).

FIGS. 5A to 5C show the contents of the map searching tables according to the second embodiment. As shown, the map searching tables are separately prepared for different scales, and include designation of the storage location storing the map files of respective regions. In the example of FIGS. 5A to 5C, the map files of the scale $1/50000$ are all stored in the hard disk of the terminal device 1, the map files of the scale $1/25000$ are all stored in the local database 5, and the map files of the scale $1/10000$ are all stored in the map database 12 in the WWW server 10. As mentioned above, when designating a desired region to be searched for, the user additionally inputs information relating to the scale of the map file. Therefore, the map searching program refers to the map searching table corresponding to the scale designated by the user, and accesses the designated storage location to obtain the map file. By storing the map data of small scale in the terminal device 1, storing the map data larger scale in the local database 5 and storing the map data of further larger scale in the map database 12 of the WWW server 10, if it is sufficient for the user to obtain relatively rough map data, the map searching program simply reads out the map file from the terminal device 1 without accessing the LAN 6 and the WWW server 10. Therefore, the map information can be quickly obtained. If the user needs more detailed map data, the map searching program accesses the local database 5 or the map database 12 according to the designated scale to obtain the map file. In general, since detailed map data of larger scale has larger information amount than rough map data of smaller scale, it is preferred that the detailed map data is stored in the local database 5 or the map database 12 having large storage capacity. On the contrary, rough map data of smaller scale has generally smaller information amount, and hence storing the rough map data in the terminal device 1 does not excessively occupy the storage capacity of the terminal device 1.

In some regions (e.g., regions corresponding to forest or sea, etc.), map files of larger scale may not be prepared. In such a case, the map searching table indicates that the map file of that scale, corresponding to those regions, do not exist (see. FIG. 6A, region n–m). In that case, the map searching program may be designed to show the message notifying the user of the nonexistence of the map file of the corresponding scale. Alternatively, the map searching program may be designed to display the map file of one level smaller scale instead of the map data of the designated scale. For example, if the map file of the scale $1/25000$ for the region n–m does not exist in the example shown in FIG. 6A, the map file of the scale $1/50000$ for the region n–m may be automatically obtained and displayed.

In addition, it is possible to store the map data of the same scale for the same region at two different storage locations. For example, in the example of the map searching table shown in FIG. 6B, for the regions 1–1 and 1–2, the map data of the scale $1/50000$ is stored in both the map database 12 in the WWW server 10 and the local database 5 in the local server 3. In such a case, the map searching program normally accesses the storage location nearer from the terminal device (i.e., the local database 5 in this case) and obtains the map file. Thus, by storing the same map data at two different storage locations, if one storage location becomes inaccessible due to some reasons, the map searching program can access the other storage location to obtain the same map file, and hence the reliability of the system may be improved. It is noted, however, that the consumption of the storage area in the storage location is doubled in that case. In this view, it is preferred that such duplicate storage of the same map data is efficiently made for some special regions, for example, a commercially important region or a frequently accessed region, such as the central regions in Tokyo.

While the above description discussed the map data of three different scales, if the map data of larger number of different scales exist, they may be classified into three groups in the order of those scales and stored in the three storage locations.

[D] 3rd Embodiment

The third embodiment is characteristic in that the revision information of the map data is recorded in the map searching table so that the map data of the newest version may be constantly provided to the user. FIG. 7 shows an example of the map searching table including the revision history of the map files for plural regions. In FIG. 7, with respect to the region 1–1, for example, the map data in the terminal device 1 was revised on Jan. 1, 1997, and the map data in the WWW server 10 and the local server 3 were revised on Jun. 1, 1997.

Normally, the map data in the WWW server 10 and the local server 3 are revised first, and then the map data in the terminal device 1 is revised, if necessary. In searching for the map data, when the user designates the desired region, the map searching program refers to the revision information in the map searching table shown in FIG. 7. Then, the map searching program accesses the storage location having newest revision date for the designated region and obtains the newest map file. If the map data having the same revision date are stored in different storage locations (e.g., the regions 1–1 and 1–2 in FIG.7), the map searching program accesses the nearer storage location from the terminal device. In this example, the map searching program recognizes that the map data for the region 1–1 having the same revision date are stored in both the WWW server 10 and the local server 3, and accesses the local server 3, which is nearer from the terminal device 1 than the WWW server 10, to obtain the map file.

The contents of the map searching table is revised by the WWW server 10 in such a manner that the WWW server 10 10 distributes the revision information to the respective terminal devices at the same time the revised version of the map files themselves are distributed to the storage locations. By way of example, the WWW server 10 supplies the new map file for the region 3–1 to the local server 3 on Jun. 1, 1997, and then sends the revision information indicating that revision to the respective terminal devices 1 to change the contents of the revision information in the map searching table of the terminal devices, i.e., changes the revision date of the map file for region 3–1 stored in the WWW server 10 to Jun. 1, 1997. Further, if the map file for the region 3–1 stored the WWW server 10 is further revised on Oct. 15, 1997, the revision information is distributed to the terminal devices 1 and the revision date of corresponding map file for the WWW server 10 are changed to Oct. 15, 1997 in all terminal devices 1. Thus, the map searching tables in all terminal devices are revised every time when the map data is revised, and hence the user can obtain the map data of the newest version from any terminal device 1. It is noted that plural map searching tables as shown in FIG. 7 may be prepared for the map data of different scales.

As an alternative of the third embodiment described above, a storage device may be prepared in each terminal device I which stores the revised map file itself as well as information as to the region of the map file, the scale, etc. when the map revision is made. If the user instructs searching the map data of a certain region, the map searching program refers to the revision information in the storage device first of all, and displays the corresponding map data if it is stored in the storage device. If the corresponding map data does not exist in the storage device, the map searching program can obtain the map data from other storage locations, such as the local database 5 or the map database 12. In that case, the map searching program receives the revision information from the WWW server 10 when the map revision is made, and stores it in the storage device.

[E] 4th Embodiment

Figure 8:
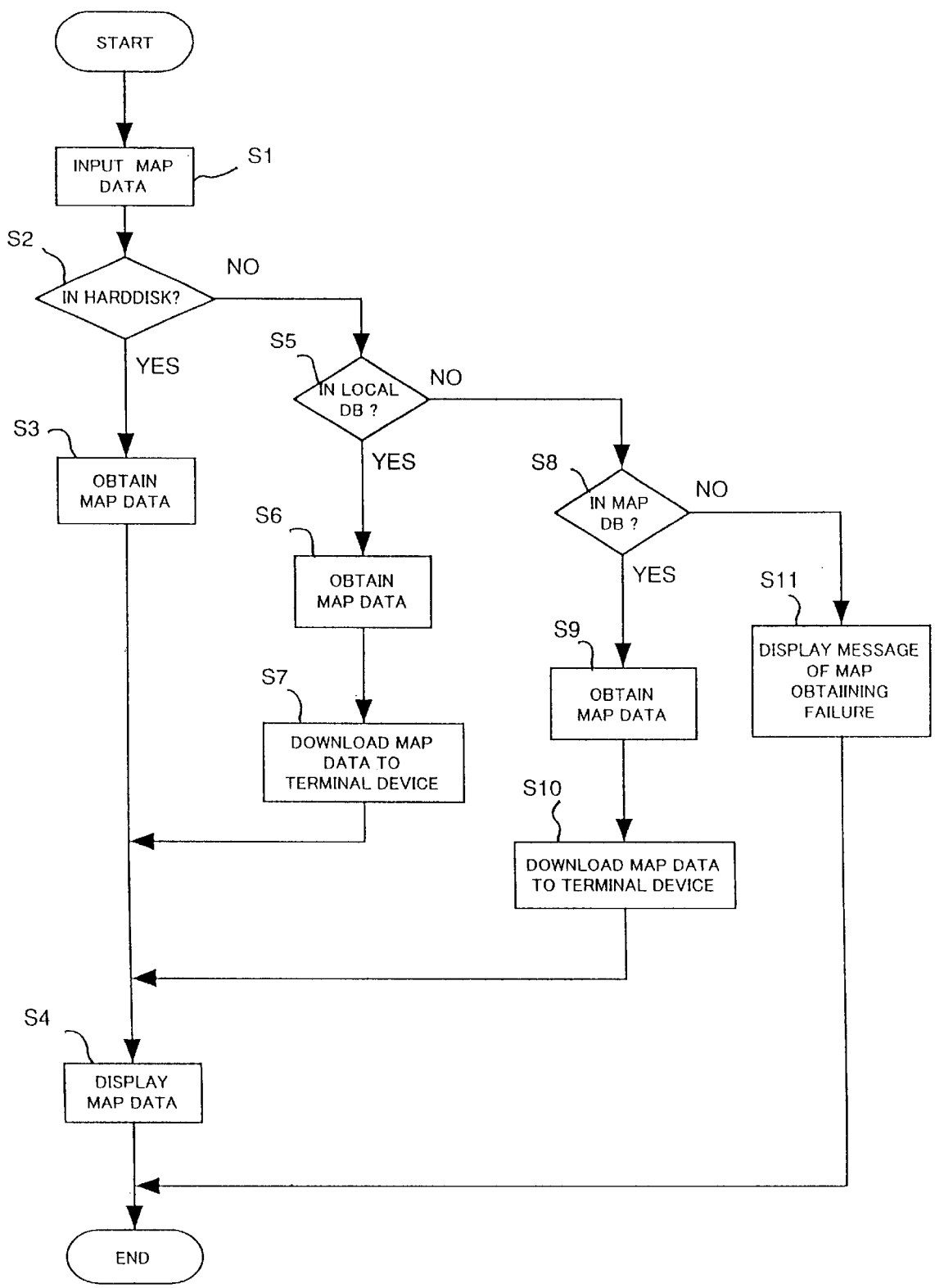
FIG. 8 is a flowchart showing a map searching method according to the fourth embodiment of the present invention.

In the fourth embodiment, the map data is searched for without using the map searching table. FIG. 8 is a flowchart the search method according to the fourth embodiment. With the system configuration shown in FIG. 1, when the user designates the map data to be searched for via the terminal device 1 (step S1), the map searching program determines whether or not the designated map data is stored in the hard disk of the terminal device 1 (step S2). If the determination results in YES, the map searching program accesses the hard disk and obtains the designated map data (step S3), and then displays the map data thus obtained on the display screen of the terminal device 1 (step S4).

If the determination in step S2 results in NO, the map searching program connects with the local server 3 via the LAN 6, and determines whether or not the designated map data is stored in the local database 5 within the local server 3 (step S5). If the determination results in YES, the map searching program accesses the local database 5, and obtains the designated map data (step S6). Subsequently, the map searching program downloads the map data to the terminal device 1 (step S7), and displays it on the display screen of the terminal device 1 (step S4).

If the determination in step S5 results in NO, the map searching program connects with the WWW server 10 via the LAN 6, the relay server 2 and the internet 7, and determines whether or not the designated map data is stored in the map database 12 of the WWW server 10 (step S8). If the determination results in YES, the map searching program accesses the map database 12, and obtains the designated map data (step S9). Then, the map searching program downloads the map data to the terminal device 1 (step S10), and displays it (step S4).

If the determination in step 8 results in NO, the map searching program displays a message, to the user, stating that the designated map data does not exist or cannot be obtained for some reasons (step S11).

The above method of the fourth embodiment may be modified such that the map searching program refers to the above mentioned map searching table. Namely, the map searching program may determine whether or not the designated map data is stored in the hard disk in the terminal device 1, and then in the local database 5 in the local server 3, and then in the map database in the WWW server 10, by referring to the contents of the map searching table.

According to the map searching method of the fourth embodiment described above, if the designated map data is stored in plural storage locations (e.g., in both the local database and the map database 12, or in both the hard disk of the terminal device 1 and the local database 5), the map searching program may obtain the map data from the nearest storage location with shortest access time.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-147889 filed on May 28, 1998 including the specification, claims, drawings and summary is incorporated herein by reference in its entirety.

What is claimed is:

1. A map information providing system for providing map data to a terminal device via a data transmission path, comprising:

a first server, the first server comprising a first storage unit for storing map data; and a second server connected with the first server and the terminal device via a network, the second server comprising a second storage unit for storing the map data, the first server comprising:

a unit for producing map searching table which designates at least one of the first storage unit, the second storage unit and a third storage unit in the terminal device, from which certain map data is to be obtained; and a unit for transmitting the produced map searching table to the terminal device to be stored in the terminal device, wherein map data of regions of different scales are stored in different storage units and these data are accessed through the map searching table so as to optimize and minimize the time in which users access the network.

2. The system according to claim 1, wherein the map searching table includes instructions to obtain the map data of a first region from the third storage unit, to obtain the map data of a second region broader than the first region from the second storage unit and to obtain the map data of a third region broader than the second region from the first storage unit.

3. The system according to claim 1, wherein the map searching table includes instructions to obtain the map data of a first scale from the third storage unit, to obtain the map data of a second scale larger than the first scale from the second storage unit and to obtain the map data of a third scale larger than the second scale from the first storage unit.

4. The system according to claim 1, wherein the map searching table includes revision information indicating revision dates of the respective map data stored in the first storage unit, the second storage unit and the third storage unit.

5. The map information providing system according to claim 1, wherein users can quickly get map data which they frequently use by accessing the third storage unit in the terminal device, without connecting to the first server or the second server.

6. A map information searching method executed in a map information providing system comprising:

a first server comprising a first storage unit for storing map data;

a second server connected with the first server via a network and having a second storage unit for storing the map data; and at least one terminal device connected with the second server via the network and comprising a third storage unit for storing the map data and a map searching table which designates at least one of the first storage unit, the second storage unit and a third storage unit in the terminal device, from which certain map data is to be obtained, said method comprising the steps of:

at the terminal device, receiving from a user an input designating map data to be searched for;

referring to the map searching table and determining one of the first storage unit, the second storage unit and the third storage unit, from which the map data designated by the user is to be obtained;

accessing the storage unit determined by the determining step to obtain the designated map data; and displaying the obtained map data on a display device of the terminal device, wherein map data of regions of different scales are stored in different storage units and these data are accessed through the map searching table so as to optimize and minimize the time in which users access the network.

7. The method according to claim 6, further comprising the steps of:

storing the map data of a first region in the third storage unit, storing the map data of a second region broader than the first region in the second storage unit and storing the map data of a third region broader than the second region in the first storage unit; and storing, in the map searching table, information indicating one of the storage units in which the map data is stored.

8. The method according to claim 6, further comprising the steps of:

storing the map data of a first scale in the third storage unit, storing the map data of a second scale larger than the first scale in the second storage unit and storing the map data of a third scale larger than the second scale in the first storage unit; and storing, in the map searching table, information indicating one of the storage units in which the map data is stored.

9. The method according to claim 6, further comprising the step of storing, in the map searching table, revision information indicating revision dates of the respective map data stored in the first storage unit, the second storage unit and the third storage unit.

10. A map information searching method executed in a map information providing system comprising:

a first server comprising a first storage unit for storing map data;

a second server connected with the first server via a network and having a second storage unit for storing the map data; and at least one terminal device connected with the second server via the network and comprising a third storage unit for storing the map data, said method comprising the steps of:

a first step for receiving from a user, at the terminal device, an input designating map data to be searched for;

a second step for determining whether or not the designated map data is stored in the third storage unit;

a third step for accessing the third storage unit to obtain the designated map data if it is determined in the second step that the designated map data is stored in the third storage unit;

a fourth step for determining whether or not the designated map data is stored in the second storage unit if it is determined in the second step that designated map data is not stored in the third storage unit;

a fifth step for accessing the second storage unit to obtain the designated map data if it is determined in the fourth step that the designated map data is stored in the second storage unit;

a sixth step for determining whether or not the designated map data is stored in the first storage unit if it is determined in the fourth step that the designated map data is not stored in the second storage unit;

a seventh step for accessing the first storage unit to obtain the designated map data if it is determined in the sixth step that the designated map data is stored in the first storage unit; and an eighth step for displaying, on a display device of the terminal device, the map data obtained in one of the third step, the fifth step and the seventh step.

* * * * *